United States Patent [19]

Glicksman et al.

[11] 4,001,456
[45] * Jan. 4, 1977

[54] LOW CALORIE SWEETENING COMPOSITION AND METHOD FOR MAKING SAME

[75] Inventors: Martin Glicksman, Valley Cottage, N.Y.; Bartley N. Wankier, Battle Creek, Mich.

[73] Assignee: General Foods Corporation, White Plains, N.Y.

[ * ] Notice: The portion of the term of this patent subsequent to Sept. 25, 1990, has been disclaimed.

[22] Filed: Aug. 13, 1973

[21] Appl. No.: 387,848

Related U.S. Application Data

[63] Continuation-in-part of Ser. No. 55,561, July 16, 1970, Pat. No. 3,761,288.

[52] U.S. Cl. .................. 426/548; 426/658

[51] Int. Cl.$^2$ .................. A23L 1/236
[58] Field of Search .......... 426/213, 215, 217, 384, 426/455, 443, 456, 471, 380, 548, 658

[56] References Cited

UNITED STATES PATENTS

| | | | |
|---|---|---|---|
| 3,492,131 | 1/1970 | Schlatter | 426/548 |
| 3,642,491 | 2/1972 | Schlatter | 426/548 |

*Primary Examiner* — A. Louis Monacell
*Assistant Examiner* — Esther L. Massung
*Attorney, Agent, or Firm* — Daniel J. Donovan; Doris M. Bennett

[57] ABSTRACT

Readily soluble, sweetening compositions are produced by spray-drying solutions of an edible bulking agent and a dipeptide sweetening compound.

8 Claims, No Drawings

LOW CALORIE SWEETENING COMPOSITION AND METHOD FOR MAKING SAME

RELATED APPLICATION

This Application is a continuation-in-part of co-pending Application Ser. No. 55,561 filed July 16, 1970 U.S. Pat. No. 3,761,288 issued Sept. 25, 1973 entitled "Low Calorie Sweetening Composition and Method For Making Same."

BACKGROUND OF THE INVENTION

This invention relates to a readily soluble sweetening composition containing an edible bulking agent and a dipeptide sweetening agent. More particularly, it relates to a specific method of spray drying a low bulk density sweetening composition which results in a composition having extremely rapid solubility in water and a bulk density and caloric value per unit of volume considerably less than that of sucrose.

Previous attempts to produce artificial sweeteners have involved the use of saccharins and/or cyclamates. Chief among these have been attempts to produce table sweeteners which have the appearance, behavior-in-use and sweetening intensity of sucrose per unit volume such as is taught in U.S. Pat. No. 3,320,074 issued May 16, 1967. Specifically, this Patent teaches a method of spray drying an aqueous solution of saccharine and/or cyclamate whereas the solution is aerated with a non-reactive, non-inflammable gas, the amount of aeration gas defining the bulk density of the final product.

Similarly, U.S. Pat. No. 3,170,801 issued February 23, 1965 teaches a method of deriving a table sweetener having the desirable organoleptic properties of sucrose by spray drying a solution of an artificial sweetener such as saccharin or cyclamate, a water dispersible edible protein whipping agent, and a slurry of lactose into which a soluble gas has been introduced prior to drying. Problems have arisen with the use of these compounds, however, since the saccharins leaves a somewhat bitter aftertaste in the mouth and the cyclamates are now excluded from commercial food products as hazardous to human health.

It has recently been found that certain dipeptide compounds possess an intense sweetness level. Examples of these compounds are set forth in U.S. Pat. Nos. 3,475,403 and 3,492,131. Most suitable among these compounds are the lower alkyl esters of aspartyl-phenylalanine wherein the stereochemical configuration is L-L, DL-DL, DL-L or L-DL. Illustrative of the lower alkyl esters are methyl, ethyl, propyl, butyl, pentyl, hexyl, heptyl and the branched chain groups isometric therewith, with the methyl ester being the most preferred embodiment.

These dipeptide materials would appear to have great commercial applications as sweetening agents since they range up to 200 times the sweetness level of sucrose, have no discernible unpleasant aftertaste, and can be produced from naturally occurring amino acids. Problems have arisen, however, with the use of these compounds in that their rate of solution into water is markedly lower than sucrose, and that the compounds tend to decompose, losing substantially all their sweetness upon heating at temperatures above about 80° C.

SUMMARY OF THE INVENTION

It has now been found that the rate of solution of dipeptide sweetening compounds can be significantly increased by spray-drying an aqueous solution of an edible bulking agent and the dipeptide sweetening compound. The specific method utilized in this invention produces a sweetening composition having at least as rapid a rate of solubility as a freeze-dried sample on contact with water and as a result eliminates the tendency of spray dried sweeteners to float as a cohesive mass on the surface of beverages. In addition, utilization of this spray-drying method excludes the need for aerating the sweetener solution with gases that may affect the taste of the resultant product as well as cause extensive foaming problems when added to aqueous systems such as beverages. It has also been found that, surprisingly, these aqueous solutions may be spray-dried at conditions of elevated temperatures specifically, at temperatures as high as from 300° F to 500° F without significant adverse effects on the sweetening level of the dipeptide compounds.

The solid edible bulking agents suitable for use in this invention may be any of the non-toxic substances or combination of substances heretofore employed by the prior art for this purpose including the organic acids such as citric, adipic, malic, tartaric, fumaric acids, and the hydrolyzed starch materials such as dextrins and sugars. Especially suitable among these solid bulking agents are the dextrins, particulary the low dextrose equivalent (D.E.) dextrins of the class commonly known as corn syrup solids. These materials are preferred not only because they are low in caloric content and non-hygroscopic but also due to the fact that they have a low bulk density which results in a caloric value per unit of bulk that is less than sucrose though its sweetness is equivalent to sucrose, the resulting composition has the crystalline appearance of table sugar and dissolves rapidly in cold water.

It is an object of this invention to produce a low-calorie substitute for granulated sucrose.

It is a further object of this invention to produce a dipeptide-containing, low-calorie sweetening composition which has a rate of solution comparable to or greater than that of sucrose.

DESCRIPTION OF THE INVENTION

According to one embodiment of this invention, a table sugar substitute having the appearance of crystalline sucrose may be prepared by forming a uniform aqueous solution of a corn syrup dextrin material and a dipeptide sweetening agent and spray-drying this solution in a manner so as to yield an expanded product which may then, if necessary, be gound to size. The method of spray-drying of this invention concerns introducing an aqueous solution of the bulking agent and dipeptide sweetener preferably maintained at a temperature of about 150° F to 160° F for reasons of complete dissolution of the dipeptide, into the spray dryer. Prior to feeding the solution into the spray drier, the solution is preferably pumped from the container through an in-line strainer to the dryer feed pump which is equipped with a homogenizing head. Thus, when the strained feed solution is sprayed into the dryer itself, the particle size of undissolved sweetener particles is further reduced. Accordingly, the feed solution is pumped and sprayed downward and co-current with the drying air within the spray dryer. In order that the desired density of the spray-dried sweetening composition be derived, the feed concentration and inlet air temperatures are critical. For the purposes of producing the table sweetener of this invention which preferably has a density of from about 0.12 to about 0.14, a field concentration of usually not appreciably below about 50% and preferably about 60% on an "as is" solids basis at an inlet air temperature of about 450° F is preferred. However, inlet air temperatures of as low as 300° F and as high as 500° F may be used, the densities varying inversely with temperatures and concentration. Inlet temperature of below about 350° F., however, will yield end products having densities ranging from about 0.2 to about 0.3. The air outlets, although not critical to this invention, are preferably maintained at from about 225° F to about 270° F, an air outlet of 230° F at a flow of 2400 cpm being most preferred. Thus, where, for example, a density of 0.35 to 0.25 is desired, the feed concentration is accordingly adjusted to about 30% to 40% with an air inlet temperature of about 300° F. Modification of this procedure for variance of densities derived should be obvious to those skilled in the art.

Since dextrins require great care in drying due to both fire and explosion hazards, this specific method of spray drying results in operation at about half the lower explosion limit. Thus, it should be obvious to those skilled in the art that further provisions for explosion suppression devices and a high venting capability in the equipment, i.e. 1 ft.$^2$ venting area per 25–40 cu. ft., may permit use of higher capacities through use of higher feed concentration and higher inlet air temperatures with relative safety. Such conditions, in turn, would tend to produce a product of even lower density.

This method of spray drying was found unexpectedly to produce a sweetening composition having at least as great a rate of solubility than even a freeze-dried sample. Freeze-drying is ordinarily associated with producing dried compositions of such low density as to make them rapidly soluble but, unfortunately, is an extremely expensive process. This invention affords a method of drying whereat the resultant composition is not only at least as fast dissolving as a freeze-dried sample, but is also less expensive to produce.

The dextrin material used for the production of these sugar substitutes must dissolve easily in water to produce a clear solution and must be non-hygroscopic. In this regard, the D.E. (dextrose equivalent) of the dextrin material has been found to be a critical parameter. The dextrin material must have a sufficiently low molecular weight to be easly soluble in water and to produce a clear solution so that the final product will have the essential reflecting surfaces in order to give the appearance of a crystalline product. On the other hand, the molecular weight of the dextrin material must be high enough so that hygroscopicity is avoided.

Accordingly, it has been determined that for the production of table sugar substitutes, the dextrin material should have a D.E. in the range of about 4 to 20 and preferably in the range of about 5 to 10. Additionally, it has been found that the best results are obtained if the dextrin material contains an irregular distribution of the other lower (one to eight saccharide units) saccharides with a preponderance of the hexamer and heptamer. Such corn syrup dextrins have been produced by means of enzymatic hydrolysis of starch and are typified by the products available from CPC under the name Mor-Rex.

Consequently, the aforementioned specific method of spray-drying when applied to an aqueous solution comprised of a dextrin preferably a low D.E. dextrin such as Mor-Rex and a lower alkyl ester of aspartyl phenylalanine, preferably L-aspartyl-L-phenylalanine methyl ester is the preferred embodiment of this invention. The spray-dried product of this invention consists of fairly uniform small, white spheres which reflect light in a way which suggests crystallinity are readily and completely soluble in water and produce clear aqueous-based solutions.

The processes of this invention are further illustrated but not limited by the following examples:

EXAMPLE 1

Three grams of citric acid and one gram of L-aspartyl-L-phenylalanine methyl ester are dissolved in 50 ml. of water with stirring. The resulting solution is spread on a stainless steel tray (2.1 sq. ft.) and allowed to dry at ambient conditions for about two days. The dry material was then scraped from the tray and ground with a mortar and pestle. One-half gram samples of this ground material were added, with stirring, to beakers containing 200 ml. of water at 40° F. The material completely dissolved in an average time of about 55 seconds yielding solutions which were sweet with a slight acid taste.

EXAMPLE 2

A solution was prepared containing 800 grams of water (80° F), 241 grams of 5 D.E. Mor-Rex and 5.95 grams of L-aspartyl-L-phenyl-alanine methyl ester. This solution was placed in a tray at a 1.5 inch thickness and freeze dried in a Stokes Freeze Drier for 48 hours. The material was then ground to a fine powder using a Waring Blender at a high speed.

EXAMPLE 3

A solution was prepared according to the method of Example 2 and this solution was drum dried at a temperature of 130° C on a drier operating at 25 lbs./sq.in and 6.25 rpms.

EXAMPLE 4

A solution containing 384.05 grams of water, 241 grams of 5 D.E. Mor-Rex and 5.95 grams of L-aspartyl-L-phenylalanine methyl ester was prepared. This solution was then spray dried in a Niro Spray Dryer at an air pressure of 5.2 kg/sq. cm., an air inlet temperature of 160° C (320° F), an air outlet temperature of 75° C (167° F), and a rate of solution flow of 15 cc/min.

Equal weight samples of the sweetening compositions of examples 2, 3, and 4 were dissolved in coffee samples and were organoleptically determined to have a substantially equivalent sweetness level. This sweetness level is not found to significantly differ from control coffee samples containing an equal amount of the untreated dipeptide material, thus indicating the absence of any degradation of the dipeptide material during the drying operations. The rate of solubility, however, is appreciably and substantially improved.

The solubility rate of the powders from Examples 2, 3, and 4 was evaluated by recording the times required for complete solution of 1.5 gram samples of these powders (containing about 0.036 grams of sweetener) into 170 ml of water at a temperature of 40° F, with stirring. The results are summarized in the table below:

|  | 40° F (time in seconds) |
|---|---|
| Example 2 | 62 |
| Example 3 | 40 |
| Example 4 | 60 |

As is evident from the above date, the specific method of spray-drying utilized resulted in a product having an equivalent rate of solubility as the freeze-dried sample.

When 0.036 gram samples of L-aspartyl-L-phenylalanine methyl ester are sought to be dissolved in 170 ml. of water at 40° F, with stirring, average times for complete solution run about 30 minutes.

Additional tests have shown that varying the level of dipeptide in the sweetening compositions up to the level of about one part dipeptide per part of bulking agent, does not have any appreciable or predictable effect on the rate of solution.

It has also been found that the elevated temperatures, in excess of 100° C, which are employed during the spray drying operation of this invention does not effect the sweetness of the final product.

The bulk density of the final sweetening composition can be controlled by varying the solids concentration of the solution prior to spray drying. The bulk density may also be controlled by changing the method of drying, by varying the rate of drying, or by varying the conditions of pressure under which the solution is dried. Bulk densities ranging as low as about 0.04g/cc can be obtained by the process of the instant invention.

The addition of a small amount of an anti-caking agent such as tricalcium phosphate may also be used to adjust the bulk density of the final product.

Thus, by exercising proper control over the process, it is possible to produce a final product which has substantially the same bulk density of granulated sucrose or a product which has a much lower bulk density than granulated sucrose, but which, by adjusting the level of dipeptide sweetening compound, has on a volume basis, the same level of sweetness as sucrose, but a far less caloric value. More importantly, the resulting spray-dried product has a substantially greater rate of solubility and greater absolute solubility in water.

EXAMPLE 5

A sweetening composition which has on a volume basis the same sweetening power of sucrose is prepared by spray-drying a 50% solids solution containing 96.5%, 10 D.E. Mor-Rex, and 3.5% L-aspartyl-L-phenylalanine. The drier was equipped with a single 1/1TC Whirljet nozzle and was operating with a spray pressure of 500 to 700 psig., an inlet air temperature of 400° F an air flow of 2800 cu. ft./min., an air outlet temperature of 245° F, and a feed temperature of 155° F. The spray-dried powder was screened through a 16 U.S. mesh screen and blended with 0.1% by weight of tricalcium phosphate. The resultant product has a bulk density of 0.14 g/cc, has a crystalline appearance, has, on a volume basis, the same level of sweetness as granulated table sugar, and dissolves rapidly in 40° F water.

The density obtained above can be modified, particularly increased, by employing suitable agglomeration techniques such as applying moisture to a falling curtain of material as disclosed in Patents to Sienkiewicz, et al or in belt agglomerators or the like.

It will be apparent that there are variations and modifications of this invention and that the proportions, ingredients and typical operating conditions may be varied without departing from the scope of the invention.

Having thus described the invention, what is claimed is:

1. A method for producing a rapidly soluble sweetening composition comprising the steps of forming an aqueous solution of an edible bulking agent and L-aspartyl-L-phenylalanine methyl ester, said bulking agent being selected from the group consisting of organic acids, hydrolyzed starch materials and sugars, said aqueous solution containing less than one part L-aspartyl-L-phenylalanine methyl ester per part of bulking agent, and spray drying the solution at a feed concentration of not less than about 50% solids in a spray dryer apparatus having an inlet air temperature of about 350° F to about 500° F.

2. The method of claim 1 wherein the inlet air temperature is about 450° F.

3. The method of claim 1 wherein the spray dryer apparatus has an outlet air temperature of from about 225° F to about 270° F.

4. The method of claim 3 wherein the outlet air temperature is about 230° F.

5. The method of claim 4 wherein the sweetening solution is maintained at a temperature of about 150° F to about 160° F while being introduced into the spray dryer.

6. The method of claim 1 wherein the solution is pumped through an in-line strainer to the spray dryer feed pump equipped with an homogenizing head.

7. The method of claim 6 wherein the bulking agent is a dextrin having a dextrose equivalent is about 5 to about 10, and wherein the dextrin has an irregular distribution of lower saccharides with a preponderance of the hexamer and heptamer.

8. The method of claim 7 wherein the solution is pumped and sprayed downward and co-current with the drying air into the spray dryer.

* * * * *